United States Patent [19]

Reti

[11] 4,127,163

[45] Nov. 28, 1978

[54] FREEZER-SUBLIMER FOR GASEOUS DIFFUSION PLANT

[75] Inventor: George R. Reti, San Rafael, Calif.

[73] Assignee: Bechtel International Corp., San Francisco, Calif.

[21] Appl. No.: 715,468

[22] Filed: Aug. 18, 1976

[51] Int. Cl.[2] .............................................. F25J 3/08
[52] U.S. Cl. ..................................... 165/61; 165/105; 165/110; 55/82; 55/269; 62/12; 62/46; 23/294 R
[58] Field of Search .......................... 165/61, 110, 105; 23/294; 55/82, 269; 62/46, 47, 12, 333, 352

[56] References Cited

U.S. PATENT DOCUMENTS

| 2,013,515 | 9/1935 | Heitman | 62/333 |
|---|---|---|---|
| 2,083,611 | 6/1937 | Marshall | 165/105 X |
| 2,852,517 | 9/1958 | Lynn | 55/82 X |
| 3,160,490 | 12/1964 | Fabre et al. | 62/12 X |
| 3,819,333 | 6/1974 | Brand et al. | 23/294 X |
| 3,834,173 | 9/1974 | Gillies et al. | 62/46 |
| 3,961,665 | 6/1976 | Langbroek et al. | 23/294 R X |
| 4,003,214 | 1/1977 | Schumacher | 165/105 X |

FOREIGN PATENT DOCUMENTS 1,331,238  9/1973  United Kingdom ..................... 165/111

*Primary Examiner*—Albert W. Davis, Jr.
*Attorney, Agent, or Firm*—Townsend and Townsend

[57] ABSTRACT

A method and apparatus is disclosed for freezing and subliming uranium hexafluoride ($UF_6$) as part of a gaeous diffusion plant from which a quantity of the $UF_6$ inventory is intermittently withdrawn and frozen to solidify it. A plurality of upright heat pipes holds a coolant and is arranged in a two compartment vessel, the lower compartment is exposed to $UF_6$, the higher one serves for condensing the evaporated coolant by means of cooling water. In one embodiment, each pipe has a quantity of coolant such as freon, hermetically sealed therein. In the other embodiment, each pipe is sealed only at the lower end while the upper end communicates with a common vapor or cooling chamber which contains a water cooled condenser. The cooling water has a sufficiently low temperature to condense the evaporated coolant. The liquid coolant flows gravitationally downward to the lower end portion of the pipe. $UF_6$ gas is flowed into the tank where it contacts the finned outside surface of the heat pipes. Heat from the gas evaporates the coolant and the gas in turn is solidified on the exterior of the heat pipe sections in the tank. To recover $UF_6$ gas from the tank, the solidified $UF_6$ is sublimed by passing compressed $UF_6$ gas over the frozen $UF_6$ gas on the pipes or by externally heating the lower ends of the pipes sufficiently to evaporate the coolant therein above the subliming temperature of the $UF_6$. The subliming $UF_6$ gas then condenses the coolant in the vertical heat pipes, so that it can gravitationally flow back to the lower end portions.

26 Claims, 2 Drawing Figures

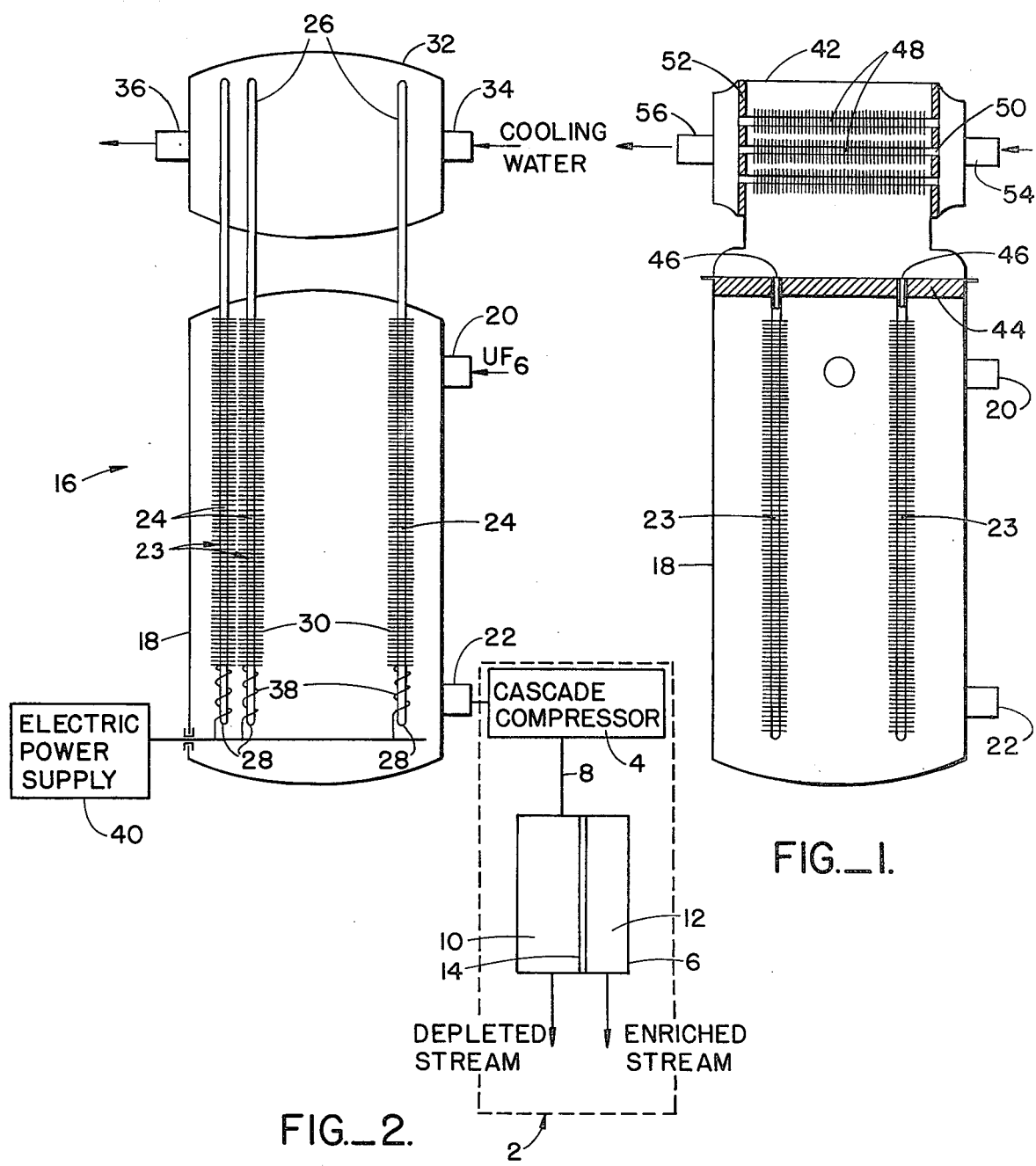

FREEZER-SUBLIMER FOR GASEOUS DIFFUSION PLANT

BACKGROUND OF THE INVENTION

The present invention relates to gas freezer-sublimers such as are employed in gaseous diffusion plants for enriching uranium in its U-235 content. Such freezer-sublimers are employed for the temporary storage of large gas volumes in their solid state to reduce storage space requirements.

The gaseous diffusion process for uranium enrichment is presently the most economical for the separation of the isotopes of uranium. The process is based on the fact that in a mixture of two gases of different molecular weight, molecules of the lighter gas will on the average be travelling at higher velocities than those of the heavier gas. If there is a porous barrier with holes just large enough to permit passage of the individual molecules but without permitting bulk flow of the gas as a whole, the probability of a gas molecule passing through the barrier will be directly proportional to its velocity. From kinetic theory it can be shown that the velocity of a gas molecule is inversely proportional to the square root of its molecular weight, so that the efficiency of gaseous diffusion will depend on the ratio of the square roots of the molecular weights of the two gases present. The two isotopes in uranium hexafluoride ($UF_6$) to be separated are $U-235F_6$ and $U-238F_6$ and their molecular weight is 349 and 352, respectively. The efficiency of separation depends on the quantity $$\sqrt{352/349} = 1.0043$$

Since this number is close to one, the separation is very small in any one step of the process. Accordingly, a large number of separation or diffusion stages must be combined in a so-called cascade.

In each diffusion stage $UF_6$ gas is compressed, passed through a cooler to remove the heat of compression, and then admitted to a vessel containing the porous barrier. About half the gas entering the vessel diffuses through the barrier and passes to the next higher stage. This diffused gas contains a slightly higher concentration of the U-235 isotope. The undiffused gas is slightly depleted in the U-235 isotope, and passes to the next lower stage. More than a thousand individual stages are required to bring about the necessary overall change in composition in which the uranium is enriched to 2 to 4 percent U-235.

Gaseous diffusion plants of this type require substantial $UF_6$ storage capacities. In the past, $UF_6$ was stored in its gaseous form, taking up great amounts of storage space, or solidified in a freezer-sublimer on suitable surfaces so that a relatively large amount of $UF_6$ can be conveniently stored.

Prior art $UF_6$ freezer-sublimers principally comprise gas storage tanks in which finned heat exchanger tubes were mounted. The heat exchanger required means for pumping the freon coolant through the system in at least one direction and multiple valving to enable the reversal of the freon flow and the cooling water flow. These features made prior art freezer-sublimer systems costly and cumbersome to operate.

SUMMARY OF THE INVENTION

The present invention provides a new freezer-sublimer such as the ones employed in gaseous diffusion plants for enriching uranium hexafluoride. The invention relates both to a method for operating a freezer-sublimer and to the construction thereof.

Generally speaking, the method of operating a freezer-sublimer involves the provision of multiple spaced-apart and preferably finned heat pipes which are partially filled with a coolant such as freon. At least the lower ends of the pipes are closed to retain the freon therein and the pipes are upwardly inclined from the lower to the upper end and preferably they are vertical. In operation, gaseous coolant adjacent to the upper pipe ends is sufficiently cooled to condense it into liquid coolant which thereafter is gravitationally flowed towards the lower pipe ends. $UF_6$ gas is flowed over the exterior of the pipes to evaporate the coolant within the pipes and simultaneously cool the $UF_6$ gas so that it solidifies on the pipes.

The solidified $UF_6$ is kept within the freezer-sublimer for as long as it is to be stored. To withdraw the $UF_6$, hot, compressed $UF_6$ gas, which is readily available in a gas diffusion plant, is passed over the frozen $UF_6$ on the pipes. Alternatively, the coolant is heated in the lowermost portion of the heat pipes, e.g., with an electrical resistance heater to evaporate it and raise its temperature above the subliming temperature of the frozen $UF_6$. Consequently, as the evaporated (and heated) coolant rises gravitationally towards the upper pipe ends, where solid $UF_6$ is stored, the $UF_6$ is sublimed and freed for withdrawal from the freezer-sublimer. The resubliming $UF_6$ condenses the freon gas for gravitational return to the lower pipe ends to repeat the just described heat exchange cycle.

The just outlined method of the present invention is practised with a corresponding apparatus forming part of this invention and generally comprising a vessel including means for introducing the $UF_6$ gas into the vessel. A plurality of spaced apart heat exchange conduits are disposed in the vessel. Upper ends of the conduits are disposed outside the vessel. Each conduit defines a continuously inclined path between its ends and holds a coolant, e.g. freon so that the coolant in its liquid state can gravitationally flow from the upper end towards the lower end and the coolant in its gaseous state can gravitationally rise in the conduit towards the upper end. In this manner, heat from the $UF_6$ gas introduced into the vessel is transmitted to the liquid coolant, the liquid coolant evaporates, and the gas freezes in its solid form on the conduits.

A cooling chamber is disposed above the vessel and the conduits communicate with the chamber. Means is provided for cooling the chamber sufficiently so that a gaseous coolant in the chamber condenses and the resulting liquid coolant flows gravitationally back into the conduits and towards the lower ends thereof. Furthermore, means is provided for selectively heating and solidified $UF_6$ on the conduits sufficiently to sublime it whereby the freezer-sublimer can be operated as above discussed.

In one embodiment of the invention the upper ends of the conduits are open and in fluid communication with the cooling chamber. The cooling chamber includes a condenser, e.g., finned pipes through which a cooling medium such as water of the appropriately low temperature flows so that the evaporated freon condenses in the cooling chamber. The resulting liquid freon then flows gravitationally back into the conduits and towards the lower ends thereof.

In another embodiment of the invention the upper ends of the conduits are closed or sealed and disposed within the cooling chamber. In that embodiment the cooling medium, e.g., water, flows through the chamber in direct contact with the exterior of the conduits to cool and condense the evaporated freon for gravitational return of the liquid freon towards the lower ends of the conduits.

The subliming of the frozen $UF_6$ on the heat exchange conduits in the vessel can be performed by flowing compressed, relatively hot $UF_6$ gas through the vessel to thereby heat and evaporate the frozen $UF_6$. Compressed $UF_6$ gas is readily available in a gas diffusion plant. Alternatively, lower end portions of the heat exchange conduits in the vessel are heated, e.g., with an electrical resistance heater, to evaporate the freon therein and to permit it to gravitationally rise upwardly towards the portion of the conduits to which the frozen $UF_6$ adheres. There the evaporated freon is recondensed for gravitational return to the lower portion. In this process, heat is liberated which sublimes the $UF_6$ on the exterior of the heat exchange conduits.

It will now be apparent that the present invention provides a freezer-sublimer which constitutes a significant improvement over the prior art because it eliminates the heretofore necessary complicated, fail-prone and expensive valving and pumping of the coolant. Instead, a plurality of simple, vertically oriented heat pipes are provided. A continuous heat exchange cycle including a cycle reversal is accomplished without the need for any valves, pumps and the like. Instead, the coolant is circulated gravitationally during both the freezing and resubliming cycles. The evaporated coolant is condensed in the uppermost portion of the freezer-sublimer during the freezing cycle and in the midsection by resubliming the $UF_6$ gas during the subliming cycle. The evaporation of the coolant is always accomplished below the condensing section: in the mid-section by solidifying $UF_6$ during the freezing cycle and in the lowermost section during the subliming cycle when the liquid freon is heated with an electrical resistance heater.

Consequently, the present invention substantially reduces initial and operating costs for freezer-sublimers. Since the invention is particularly adapted for use in connection with gaseous diffusion plants, it aids in reducing the cost of uranium enrichment and thus it ultimately helps in reducing the cost of atomic energy.

BRIEF DESCRIPTION OF THE DRAWINGS

FIG. 1 is a schematic elevational view of the freezer-sublimer constructed in accordance with one embodiment of the present invention.

FIG. 2 is a schematic elevational view of a freezer-sublimer constructed in accordance with another embodiment of the present invention.

DESCRIPTION OF THE PREFERRED EMBODIMENTS

Referring first to FIG. 2, a gaseous diffusion plant 2 is schematically illustrated. In the diffusion plant, uranium hexafluoride gas ($UF_6$) is enriched in the U-235 isotope by first compressing the gas in a compressor 4 and thereafter flowing the gas via a cooler (not shown) into a diffusion stage. A large number of such stages are required to achieve the required enrichment but only one stage 6 is shown in the drawings. The stage comprises an inlet 8 receiving compressed $UF_6$ gas from compressor 4, a high pressure chamber 10 and low pressure chamber 12 separated by a porous barrier 14. About half of the gas entering stage 6 diffuses through the barrier and passes to the next higher stage. This diffused gas contains a slightly higher concentration of the U-235 isotope. The undiffused gas is slightly depleted in the U-235 isotope, and passes to the next lower stage. More than a thousand individual stages are required to bring about the necessary overall change in composition in which the uranium is enriched to 2 to 4 percent U-235.

As above described, $UF_6$ gas is stored in solid form during power cutbacks or maintenance outages or portions of the cascade. The freezer-sublimer comprises a storage tank or vessel 18 of a generally upright configuration and orientation which has a $UF_6$ gas intake conduit 20 and a gas outlet conduit 22 in fluid communication with the cascade compressor 4. Alternatively, conduit 22 can be employed as a combined $UF_6$ gas inlet and outlet and conduit 20 can be employed for bleeding non-condensable substances in the gas back to the gaseous diffusion process gas lines (not separately shown).

A plurality of heat pipes 23 are disposed within storage tank 18. Each pipe is partially filled with liquid freon as a coolant to form a coolant pool in each pipe. The pipe has a vertically oriented intermediate section 24 a portion of which is disposed within storage tank 18 and terminates in an upper pipe end 26 and a lower pipe end 28. In the embodiment illustrated in FIG. 2 both ends of the pipes are closed so that no coolant can escape therefrom. To facilitate the heat exchange between the vertical heat pipe sections in storage tank 18 and $UF_6$ gas in the tank, the pipe sections are fitted with a multiplicity of generally horizontally oriented, spaced apart heat exchange fins 30.

The uppermost pipe ends 26 are disposed in a cooling chamber 32 that is positioned vertically above storage tank 18 and which includes an inlet 34 and an outlet 26 for a cooling medium such as water of the appropriate temperature.

Storage tank 18 and cooling chamber 32 are mounted to suitable support structure (not shown in the drawings) and heat pipes 23 are sealed to the storage tank and the cooling chamber, respectively, to prevent leakage of $UF_6$ gas or of cooling water.

Electrical resistance heaters 38 are attached to the portions of the pipes adjacent lower pipe ends 28 and connected with a low voltage power supply 40. When the heaters are energized the lower pipe sections and therewith the liquid freon disposed therein is heated to the desired temperature as more fully described below.

Turning now to the operation of freezer-sublimer 16 illustrated in FIG. 2, when $UF_6$ is to be stored in the freezer-sublimer 16 cooling water is flowed through the cooling chamber 32 and $UF_6$ is allowed to enter the storage tank 18 of the freezer-sublimer. Inside the storage tank the gaseous $UF_6$ encounters the finned heat pipes 23 which, by virtue of their cooler temperature, take heat from the entering gas. This heat is conducted through fins 30 and the pipe walls to the coolant, e.g. the freon contained within each pipe. With an increase in temperature (caused by the relatively warm or hot $UF_6$ entering tank 18) the coolant evaporates and rises as bubbles to the top of the coolant pool in the pipes. It continues its upward motion in gaseous form until it reaches the upper ends 26 of the pipes 23 disposed in cooling vessel 32 above the tank 18. The gaseous coolant contacts the cooled upper ends of the pipes, condenses and the condensate returns, falling by gravity, to the lower portions of the pipes 23 in tank 18 of the freezer-sublimer to provide continued replenishment for the evaporating coolant. As the freezing process continues, gravity circulation in the coolant loop becomes firmly established, drawing the liquid coolant to the lower regions of the pipes 23 for re-cycling.

As temperatures, pressures and velocities achieve equilibrium, frozen $UF_6$ begins to form on the fins 30 of pipes 23 of the freezer-sublimer. This process is allowed to continue until the design weight of inventory removal has been accommodated in the freezer-sublimer.

When it is desired to return the frozen $UF_6$ inventory in gaseous form to the process gas lines, electrical heating elements 38, which are wrapped around each heat pipe 23 below the end of the finned section, are energized. Heat is thereby conducted to the portion of the coolant in the immediate vicinity of the heating elements which causes coolant to evaporate and to rise through the finned section of pipes 23 to which the frozen $UF_6$ adheres. In passing, the rising, heated freon imparts heat to fins 30 and thereby to the $UF_6$, which, thereupon, commences to sublime. The heat is continuously applied until all the $UF_6$ is sublimed.

During the freezing cycle the gas flows into tank 18 of the freezer-sublimer by reason of the difference in volume taken up by the $UF_6$ in its gaseous from as opposed to the volume required to contain the same mass in its solidified form; the former being substantially greater than the latter. Since a gas will completely fill a given space in which it is contained, an increase in its density through freezing a portion of it, draws additional gas into that space in order to maintain the pressure inside the space constant. This phenomenon is employed in reverse when it is desired to resublime the $UF_6$ held in frozen storage.

It should be noted that for proper operation the pipes are preferably vertically oriented. They may be upwardly inclined at an angle to the vertical but their inclination must be continuous from the lower end 28 to the upper end 26 to prevent the formation of gas traps so that freon gas that formed at the lower pipe end can gravitationally rise to the upper pipe end and freon condensate formed at the upper pipe end can gravitationally flow downwardly towards the lower pipe end. In other words, the intermediate pipe sections must be free of gas entrapping of liquid flow interrupting discontinuities in the pipe.

The actual $UF_6$ freezing temperature, the actual freon temperature and the actual cooling water temperature and all related pressures are known to those skilled in the art and to the proper authorities, namely, the U.S. Energy Research & Development Administration (ERDA). Some of this information, however, is classified by ERDA and may not be presently divulged and, therefore, cannot be set forth herein. Nevertheless, it can be presently obtained by persons having the proper credentials and authority.

Referring to FIG. 1, in another embodiment of the invention, the freezer-sublimer again comprises a storage tank 18 of a generally upright configuration which has a $UF_6$ gas intake 20 and a gas outlet 22 in fluid communication with the cascade compressor (not shown in FIG. 1). It also comprises a plurality of heat pipes 23 which are partially filled with liquid freon and which have an upright, e.g., vertical orientation as above-described.

A cooling chamber 42 is mounted directly on top of the vessel 18 and includes a tube sheet 44 which separates the tank from the cooling chamber and into which the upper ends 46 of heat pipes 23 are rolled. The upper pipe ends are open so that a fluid communication is established between the heat pipes and cooling chamber 42.

A plurality of condenser tubes 48 extends through the cooling chamber. The condenser tubes are tied into spaced apart manifold plates 50, 52 for communication with a cooling water intake 54 and a cooling water outlet 56, respectively. Both the condenser tubes 48 and the heat pipes 23 are finned to facilitate the heat transfer.

The operation of the embodiment illustrated in FIG. 1 is similar to that of the embodiment shown in FIG. 2. To summarize it, during a freezing cycle, $UF_6$ gas enters vessel 18 via intake 20. As the gas contacts the liquid freon pool in the pipes, freon is evaporated by cooling the $UF_6$ gas so that the gas freezes out on the heat pipes 23. The evaporated freon rises gravitationally into cooling chamber 42. There the freon gas condenses on tubes 48, the condensate drips onto tube sheet 44 and the liquid freon flows gravitationally back into heat pipes 23 and towards the lower ends thereof where the cycle is repeated.

To sublime the frozen $UF_6$ on heat pipes 23, the aforementioned method can be employed by heating the freon pool at the lower end of the heat pipes. Alternatively, the gas can be sublimed by passing compressed $UF_6$ gas (which is readily available in gas diffusion plants) into the interior of storage tank 18 via intake conduit 20. The gas sublimes the frozen $UF_6$ on the heat pipe and is withdrawn via outlet 22 as aforementioned. During this alternative subliming cycle the coolant in the heat pipes remains passive.

I claim:

1. A method of operating a freezer-sublimer of a gaseous diffusion plant in conjunction with a cascade diffusion separation of $UF_6$ gas comprising the steps of: forming a plurality of upwardly extending heat pipes and placing a quantity of coolant in the pipes; cooling the coolant adjacent an upper end of the pipes sufficiently to transform evaporated coolant into liquid coolant; gravitationally flowing the liquid coolant from adjacent the upper end towards a lower end of the pipes; flowing $UF_6$ gas over an exterior of a portion of the pipes disposed below their upper ends to thereby cool the gas and solidify it on such pipe portions; and intermittently subliming the solidified gas by heating it.

2. A method according to claim 1 wherein the heating step comprises the step of electrically heating the exterior of the lower pipe ends to thereby heat the liquid coolant therein above the subliming temperature for the solidified $UF_6$ gas, whereby the coolant is evaporated and rises to the upper pipe ends; withdrawing sublimed $UF_6$ gas from the vicinity of the pipes; and returning the evaporated coolant to its liquid state adjacent the upper pipe ends and gravitationally flowing it back to the lower pipe ends.

3. A method according to claim 1 wherein the step of cooling the evaporated coolant for return to its liquid phase comprises the step of passing a cooling water flow over an exterior of the upper pipe ends.

4. A method according to claim 1 wherein the step of flowing the liquid coolant from the upper ends to the lower ends comprises the steps of flowing the coolant along a vertical path between the upper and the lower heat pipe ends.

5. A method according to claim 1 wherein the upper ends of the heat pipes are in fluid communication with a closed chamber, and wherein the step of cooling comprises the steps of flowing evaporated coolant from the pipes into the chamber, cooling the evaporated coolant in the chamber sufficiently to condense it into liquid coolant, and flowing the liquid coolant from the chamber back into the heat pipe for gravitational flow of the liquid coolant towards the lower end of the pipes.

6. A method according to claim 5 wherein the cooling step further includes the step of flowing a cooling medium through conduits extending through the chamber.

7. A method according to claim 1 wherein the heating step comprises the step of flowing hot, compressed $UF_6$ gas over frozen $UF_6$ adhering to the heat pipes.

8. Apparatus according to claim 1 wherein the heating means comprises an electrical resistance heater attached to the pipes adjacent their lower ends.

9. A method of operating a uranium hexafluoride cascade gas diffusion plant including the step of intermittently storing a quantity of the gas by freezing the gas to transform it into its solid state and intermittently subliming the frozen gas, the method comprising the steps of:
providing a plurality of upright heat pipes having a sealed lower end and an open upper end communicating with a vapor cooling chamber, each pipe including a quantity of coolant cooling the chamber to a sufficiently low temperature to transform evaporated coolant therein into liquid coolant;
gravitationally flowing the liquid coolant from the chamber into the pipes and towards the lower ends of the pipes;
flowing the uranium hexafluoride gas over the pipes below the chamber to thereby transfer heat from the gas to the liquid coolant in the pipes, evaporate such coolant and cause the freezing out of the gas on the pipes;
gravitationally flowing the evaporated coolant from the pipes to the chamber for its reliquefication in the chamber; and
intermittently subliming the solid uranium hexafluoride by heating it.

10. A method of operating a uranium hexafluoride cascade gas diffusion plant including the step of intermittently storing a quantity of the gas by freezing the gas to transform it into its solid state and intermittently subliming the frozen gas, the method comprising the steps of:
providing a plurality of upright heat pipes having a sealed lower end and an upper end, each pipe including a quantity of coolant;
cooling evaporated coolant adjacent the upper end to a sufficiently low temperature to transform evaporated coolant into liquid coolant;
gravitationally flowing the liquid coolant in the pipes towards the lower ends of the pipes;
flowing the uranium hexafluoride gas over a portion of the pipes disposed below the upper ends to thereby transfer heat from the gas to the liquid coolant in the pipes, evaporate such coolant and cause the freezing out of the gas on the pipes;
gravitationally flowing the evaporated coolant towards the upper ends for its reliquefication;
intermittently subliming the solid uranium hexafluoride by externally heating the lower pipe ends sufficiently to evaporate liquid coolant and heat the evaporated coolant above the subliming temperature for the uranium hexafluoride, gravitationally flowing the evaporated coolant through the pipes towards the upper pipe ends to thereby sublime uranium hexafluoride gas while condensing the coolant and gravitationally flowing the liquid coolant back towards the lower pipe ends;
whereby the freezing and subliming of the uranium hexafluoride is accomplished by heating and cooling the coolant in the pipes and freely and gravitationally flowing the coolant in its gaseous and liquid states between the lower and the upper pipe ends, and vice versa.

11. A method according to claim 10 including the step of continuing the cooling of evaporated coolant adjacent the upper pipe ends while externally heating the lower pipe ends to reliquefy any evaporated coolant reaching the upper pipe ends.

12. Apparatus for freezing and subliming a gas comprising a vessel including means for introducing the gas into the vessel; a plurality of heat exchange conduits disposed in the vessel, each conduit having a closed lower end and being continuously upwardly inclined from the lower end towards an upper end of the conduit so that a liquid in the conduit can gravitationally flow from the upper end to the lower end and gaseous coolant can gravitationally rise from the lower end to the upper end; each conduit including a quantity of a coolant; means for cooling coolant adjacent the upper end of the pipes sufficiently to cause the condensation of gaseous coolant so that condensed coolant can gravitationally flow towards the lower end; whereby the introduction of the gas into the vessel causes a heat transfer from the gas to the liquid coolant in the pipes, the evaporation of the coolant and a gravitational flow of the gaseous coolant upwardly towards the upper end for recondensation, and a solidification of the gas on the pipes, and heating means comprising means for flowing a compressed gas having a temperature greater than the subliming temperature for the frozen gas into the vessel.

13. Apparatus according to claim 12 including heat transmitting fins attached to a portion of the pipes between the upper and the lower ends.

14. Apparatus according to claim 12 wherein the cooling means comprises means defining a space through which a fluid cooling medium can be flowed.

15. Apparatus according to claim 14 wherein the space includes a plurality of spaced apart conduits communicating with a source of the cooling medium.

16. Apparatus according to claim 15 wherein the upper ends of the pipes are open and in fluid communication with the space for flowing gaseous coolant into the space, so that the gaseous coolant contacts and is cooled by the conduits for the gravitational flow of the coolant condensate back into the pipes and towards the lower ends thereof.

17. Apparatus according to claim 12 wherein the cooling means comprises means defining a space separated from the vessel, and means for flowing a fluid cooling medium through the space.

18. Apparatus according to claim 17 wherein the upper ends of the pipes are sealed, and wherein the upper ends of the pipes are disposed in the space and the cooling medium contacts such upper ends for cooling and condensing gaseous coolant in the pipes.

19. A freezer-sublimer for use in gaseous diffusion plants for temporarily freezing uranium hexafluoride comprising in combination: a tank including means for supplying uranium hexafluordie gas to an interior of the tank; a heat exchanger in the tank comprising a plurality of upright conduits for freezing uranium hexafluoride thereeon, the conduits having an upper end disposed outside the tank and a lower end, each conduit defining a continuously inclined path between the ends and holding a coolant so that the coolant in its liquid state can gravitationally flow from the upper end towards the lower end and the coolant in its gaseous state can gravitationally rise in the pipe towards the upper end; means disposed above the tank for cooling gaseous coolant adjacent the upper ends of the pipes sufficiently to condense it; and means for resubliming frozen uranium hexafluoride adhering to the conduits including means for introducing hot uranium hexafluoride gas into the tank interior; whereby the heat exchanger can be operated to freeze the uranium hexafluoride gas in its solid form on the conduits or to sublime the frozen uranium hexafluoride on the conduits by contacting it with the freshly introduced hot uranium hexafluoride gas.

20. A freezer-sublimer according to claim 19 wherein the cooling means comprises means defining a cooling chamber means for flowing a cooling medium through the chamber, and transferring heat from the gaseous coolant to the cooling medium.

21. A freezer-sublimer according to claim 19 wherein the temperature raising means comprises means adjacent the lower ends of the conduits for heating coolant in the pipes sufficiently to raise the coolant temperature above the subliming temperature of the uranium hexafluoride.

22. A gaseous diffusion plant for enriching uranium hexafluoride gas in U-235 isotopes, the plant comprising a multiplicity of gas diffusion stages, each stage including means for dividing the gas flow into two parts, one of which is relatively enriched in U-235 isotopes over the other part; and a freezer-sublimer for the temporary storage of uranium hexafluoride in its solid state, the freezer-sublimer, comprising a first chamber for receiving uranium hexafluoride gas; a heat exchanger in the chamber including a plurality of spaced apart conduits having an upper end disposed outside the chamber and a lower end, the conduits defining continuously inclined paths between the ends and holding a coolant so that the coolant in its liquid state can gravitationally flow from the upper ends towards the lower ends and the coolant in its gaseous state can gravitationally rise in the conduits towards the upper ends; whereby heat from uranium hexafluoride gas introduced in the first chamber is transmitted to the liquid coolant, the liquid coolant evaporates, and the uranium hexafluoride gas freezes on the conduits; a second chamber disposed above the first chamber, the conduits communicating with the second chamber; means for cooling the second chamber sufficiently so that gaseous coolant in the second chamber condenses and the resulting liquid coolant flows gravitationally back in the conduits towards the lower ends thereof; and means for heating the solidified uranium hexafluoride gas sufficiently to sublime it; whereby the freezer-sublimer can be operated to freeze the uranium hexafluoride gas on the conduits or to sublime the frozen uranium hexafluoride on the conduits.

23. A gas diffusion plant according to claim 22 wherein the upper ends of the conduits are open and in fluid communication with the second chamber.

24. A gas diffusion plant according to claim 22 wherein the upper ends of the conduits are closed and disposed within the second chamber.

25. A gas diffusion plant according to claim 22 wherein the heating means comprises means for heating the frozen uranium hexafluoride above its subliming temperature by raising the temperature of the atmosphere in the first chamber surrounding the frozen gas.

26. A gas diffusion plant according to claim 22 wherein the heating means comprises means for raising the temperature of the coolant in the conduits adjacent the lower ends thereof above the subliming temperature for the frozen uranium hexafluoride.

* * * * *